(12) United States Patent
Peng

(10) Patent No.: US 11,601,630 B2
(45) Date of Patent: Mar. 7, 2023

(54) VIDEO PROCESSING METHOD, ELECTRONIC DEVICE, AND NON-TRANSITORY COMPUTER-READABLE MEDIUM

(71) Applicant: GUANGDONG OPPO MOBILE TELECOMMUNICATIONS CORP., LTD., Dongguan (CN)

(72) Inventor: Deliang Peng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 23 days.

(21) Appl. No.: 17/331,497

(22) Filed: May 26, 2021

(65) Prior Publication Data

US 2021/0289186 A1    Sep. 16, 2021

Related U.S. Application Data

(63) Continuation of application No. PCT/CN2019/109117, filed on Sep. 29, 2019.

(30) Foreign Application Priority Data

Nov. 27, 2018    (CN) .......................... 201811429225.3

(51) Int. Cl.
*H04N 9/77*         (2006.01)
*H04N 21/431*       (2011.01)
(Continued)

(52) U.S. Cl.
CPC ............... *H04N 9/77* (2013.01); *G06V 20/46* (2022.01); *H04N 21/4312* (2013.01); *H04N 21/44008* (2013.01); *H04N 21/4854* (2013.01)

(58) Field of Classification Search
None
See application file for complete search history.

(56) References Cited

U.S. PATENT DOCUMENTS

| 8,863,182 | B1 * | 10/2014 | Sharifi | .................. H04N 21/812 |
|---|---|---|---|---|
| | | | | 725/38 |
| 2008/0313688 | A1 * | 12/2008 | Kim | ........................ H04H 60/09 |
| | | | | 725/110 |

(Continued)

FOREIGN PATENT DOCUMENTS

| CN | 102098449 A | 6/2011 |
|---|---|---|
| CN | 102158699 A | 8/2011 |

(Continued)

OTHER PUBLICATIONS

Supplementary European Search Report dated Oct. 12, 2021 issued in corresponding EP Application No. 19890261.1, 13 pages.

(Continued)

*Primary Examiner* — Alexander Q Huerta
(74) *Attorney, Agent, or Firm* — Bayes PLLC

(57) ABSTRACT

A video processing method is for an electronic device including a screen. The method includes obtaining a target video segment, the target video segment being one of a plurality of video segments pre-divided according to an obtained video file scheduled for playing; configuring a video enhancement parameter for the target video segment; performing a video enhancement process on the target video segment according to the video enhancement parameter; and displaying the enhanced target video segment on the screen. An electronic device and a non-transitory computer-readable medium are also provided.

17 Claims, 7 Drawing Sheets

(51) Int. Cl.
*H04N 21/44* (2011.01)
*H04N 21/485* (2011.01)
*G06V 20/40* (2022.01)

(56) References Cited

U.S. PATENT DOCUMENTS

| | | | | |
|---|---|---|---|---|
| 2010/0013855 | A1* | 1/2010 | Allen | G09G 5/00 |
| | | | | 345/619 |
| 2011/0080522 | A1* | 4/2011 | Hardacker | H04N 21/435 |
| | | | | 348/576 |
| 2011/0095875 | A1* | 4/2011 | Thyssen | G09G 5/10 |
| | | | | 340/407.1 |
| 2011/0262105 | A1 | 10/2011 | Candelore | |
| 2012/0120251 | A1* | 5/2012 | Sun | H04N 17/00 |
| | | | | 348/180 |
| 2012/0315011 | A1* | 12/2012 | Messmer | H04N 7/08 |
| | | | | 386/230 |
| 2014/0072284 | A1 | 3/2014 | Avrahami | |
| 2014/0229636 | A1* | 8/2014 | Broome | H04N 21/8456 |
| | | | | 709/246 |
| 2015/0350622 | A1* | 12/2015 | Pantos | H04L 65/70 |
| | | | | 386/346 |
| 2015/0375117 | A1* | 12/2015 | Thompson | A63F 13/79 |
| | | | | 463/9 |
| 2016/0254028 | A1* | 9/2016 | Atkins | G11B 27/28 |
| | | | | 386/241 |
| 2018/0152764 | A1 | 5/2018 | Taylor et al. | |
| 2020/0227089 | A1 | 7/2020 | Xiao et al. | |

FOREIGN PATENT DOCUMENTS

| | | | |
|---|---|---|---|
| CN | 102184221 | A | 9/2011 |
| CN | 102625030 | B | 8/2012 |
| CN | 102682082 | A | 9/2012 |
| CN | 103533241 | A | 1/2014 |
| CN | 105282627 | A | 1/2016 |
| CN | 105791925 | A | 7/2016 |
| CN | 105898175 | A | 8/2016 |
| CN | 106210841 | A | 12/2016 |
| CN | 106341696 | A | 1/2017 |
| CN | 106713964 | A | 5/2017 |
| CN | 107230187 | A | 10/2017 |
| CN | 107277301 | A | 10/2017 |
| CN | 109525901 | A | 3/2019 |
| WO | 2014088975 | A1 | 6/2014 |

OTHER PUBLICATIONS

First Office Action dated Dec. 5, 2019 from China Application No. 201811429225.3.
Notice of Allowance dated Jul. 2, 2020 from from China Application No. 201811429225.3.
International Search Report and the Written Opinion dated Dec. 27, 2019 From the International Searching Authority Re. Application No. PCT/CN2019/109117.
The Communication pursuant to Article 94(3) EPC dated Aug. 5, 2022 from European Application No. 19890261.1.

* cited by examiner

VIDEO PROCESSING METHOD, ELECTRONIC DEVICE, AND NON-TRANSITORY COMPUTER-READABLE MEDIUM

CROSS REFERENCE TO RELATED APPLICATIONS

This application is a continuation of International Application No. PCT/CN2019/109117, filed on Sep. 29, 2019, which claims priority to Chinese Application No. 201811429225.3, filed on Nov. 27, 2018, the entire contents of which are incorporated herein by reference.

BACKGROUND

The present disclosure relates to the technology field of image processing, and more particularly to a video processing method, an electronic device, and a non-transitory computer-readable medium.

With the development of electronic technology and information technology, more and more devices can play videos. In the process of playing a video, it is necessary to perform operations, such as decoding, rendering, and compositing, on the video, and then the video is displayed on a display screen.

SUMMARY

The present disclosure provides a video processing method, an electronic device, and a non-transitory computer-readable medium to improve the above-mentioned deficiencies.

In a first aspect, an embodiment of the present disclosure provides a video processing method for an electronic device. The electronic device includes a screen. The method includes obtaining a target video segment, the target video segment being one of a plurality of video segments pre-divided according to an obtained video file scheduled for playing; configuring a video enhancement parameter for the target video segment; performing a video enhancement process on the target video segment according to the video enhancement parameter; and displaying the enhanced target video segment on the screen.

In a second aspect, an embodiment of the present disclosure provides an electronic device. The electronic device includes a screen, at least one processor, and at least one memory including program codes. The at least one memory and the program codes are configured to, with the at least one processor, cause the electronic device to perform: obtaining a target video segment, the target video segment being one of a plurality of video segments pre-divided according to an obtained video file scheduled for playing; configuring a video enhancement parameter for the target video segment; performing a video enhancement process on the target video segment according to the video enhancement parameter; and displaying the enhanced target video segment on the screen.

In a third aspect, an embodiment of the present disclosure provides a non-transitory computer-readable medium. The non-transitory computer-readable medium includes program instructions stored thereon for performing at least the following: obtaining a target video segment, the target video segment being one of a plurality of video segments pre-divided according to an obtained video file scheduled for playing; configuring a video enhancement parameter for the target video segment; performing a video enhancement process on the target video segment according to the video enhancement parameter; and displaying the enhanced target video segment on the screen.

BRIEF DESCRIPTION OF DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings can also be obtained from these drawings without any creative effort.

DETAILED DESCRIPTION

In order to better understand the disclosure for those skilled in the art, the technical solutions in the embodiments of the present disclosure are clearly and completely described in the following with reference to the accompanying drawings in the embodiments of the present disclosure.

Figure 1:
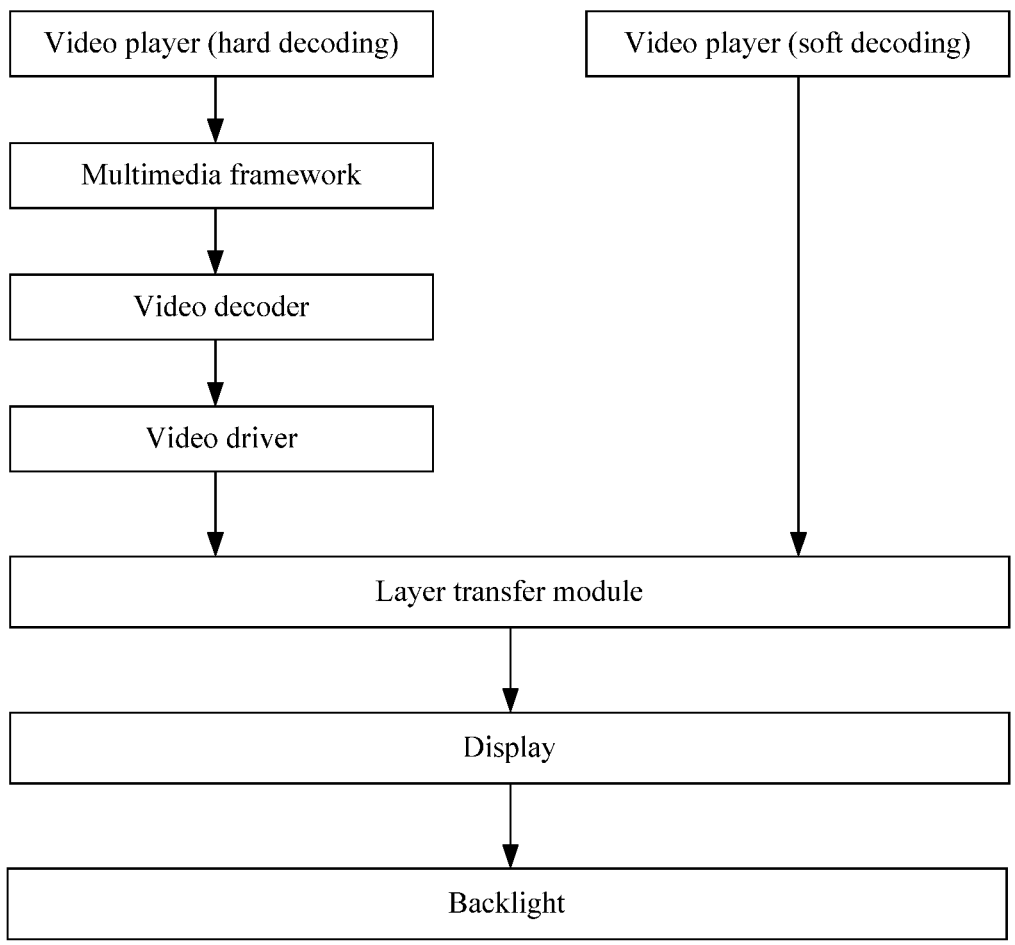
FIG. 1 illustrates a block diagram of a video play architecture provided by an embodiment of the present disclosure.

Please refer to FIG. 1. FIG. 1 illustrates a block diagram of a video play architecture. In detail, when an operating system obtains data scheduled for playing, the following step is to analyze audio/video data. A general video file is composed of two portions including video streams and audio streams. Different video formats have different container formats of audio/video. A composition process of video streams and audio streams is referred to muxer. In contrast, a division process of video streams and audio streams in a media file is referred to demuxer. When a video file is played, it is necessary to divide audio streams and video streams from file streams and respectively decode the audio streams and video streams. Decoded video frames can be rendered directly. Audio frames can be transmitted to a buffer of an audio output device and played. Certainly, timestamps of rendering the video frames and playing the audio frames must be controlled to be synchronized.

In detail, the video decoding can include hard decoding and soft decoding. In the hard decoding, a portion of video data which is originally processed by a central processing unit (CPU) is processed by a graphics processing unit (GPU). Parallel computing ability of the GPU is far higher than parallel computing ability of the CPU. As such, loading of the CPU can be decreased significantly. When utilization of the CPU is decreased, the CPU can execute other programs synchronously. Certainly, for a processor with better performance, for example, i5 2320 or one type of a four-core processor of AMD, the hard decoding and the soft decoding can be selected according to requirements.

In detail, as shown in FIG. 1, a media framework obtains a video file scheduled for playing from a client via an application program interface (API) of the client and transmits the video file to a video decoder. The media framework is a multimedia framework in an Android system. Mediaplayer, MediaPlayerService, and Stagefrightplayer constitute a multimedia basic framework in the Android system. The multimedia framework adopts a C/S structure. Mediaplayer is served as a client side of the C/S structure. MediaPlayerService and Stagefrightplayer are configured to be a server side of the C/S structure and responsible for playing a multimedia file. The server side completes a request of the client side and responses to the request via Stagefrightplayer. Video Decode is a super decoder integrating commonly used audio/video decoding and play used for decoding video data.

In the soft decoding, the CPU decodes a video via software. After the video is decoded, the CPU invokes the GPU to render and merge the decoded video and then displays the video on a screen. The hard decoding independently executes the decoding mission via a dedicated slave device without the help of the CPU.

Regardless of the hard decoding or the soft decoding, after the video data is decoded, the decoded video data is transmitted to a layer transfer module (SurfaceFlinger). SurfaceFlinger renders and merges the decoded video and then displays the video on the screen. SurfaceFlinger is an independent service which receives all of Surfaces of Window to be inputs, calculates a position of each Surface in a final composite image according to parameters, such as ZOrder, transparency, a size, and a position. The calculated position is transmitted to HWComposer or OpenGL to generate a final display buffer, and then the final display buffer is displayed on a specific display device.

As shown in FIG. 1, in the soft decoding, after decoding the video data, the CPU transmits the decoded video data to SurfaceFlinger to render and compose the decoded video data. In the hard decoding, after decoding the video data, the GPU transmits the decoded video data to SurfaceFlinger to render and compose the decoded video data. SurfaceFlinger invokes the GPU to implement image rendering and composition and display the video.

Figure 2:
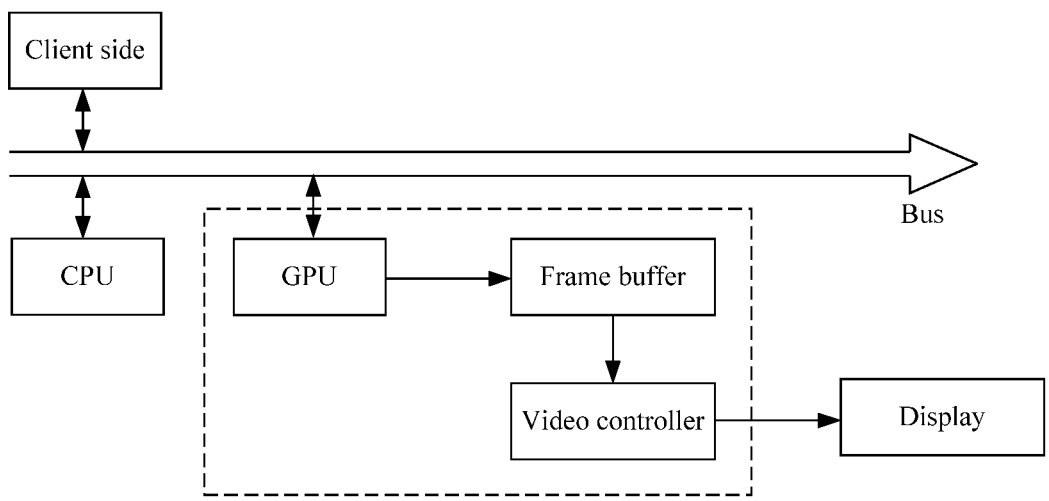
FIG. 2 illustrates an image rendering architecture provided by an embodiment of the present disclosure.

As an implementation, a process of image rendering is shown in FIG. 2. The GPU obtains a video file scheduled for playing which is transmitted by a client side. After the video file is decoded, decoded video data is obtained. The decoded video data is transmitted to the GPU. After the GPU renders, a rendering result is stored in a frame buffer. A video controller reads the data in the frame buffer row-by-row according to an HSync signal. A digital-to-analog conversion is performed on the read data. The converted data is transmitted to the display device for display.

Figure 3:
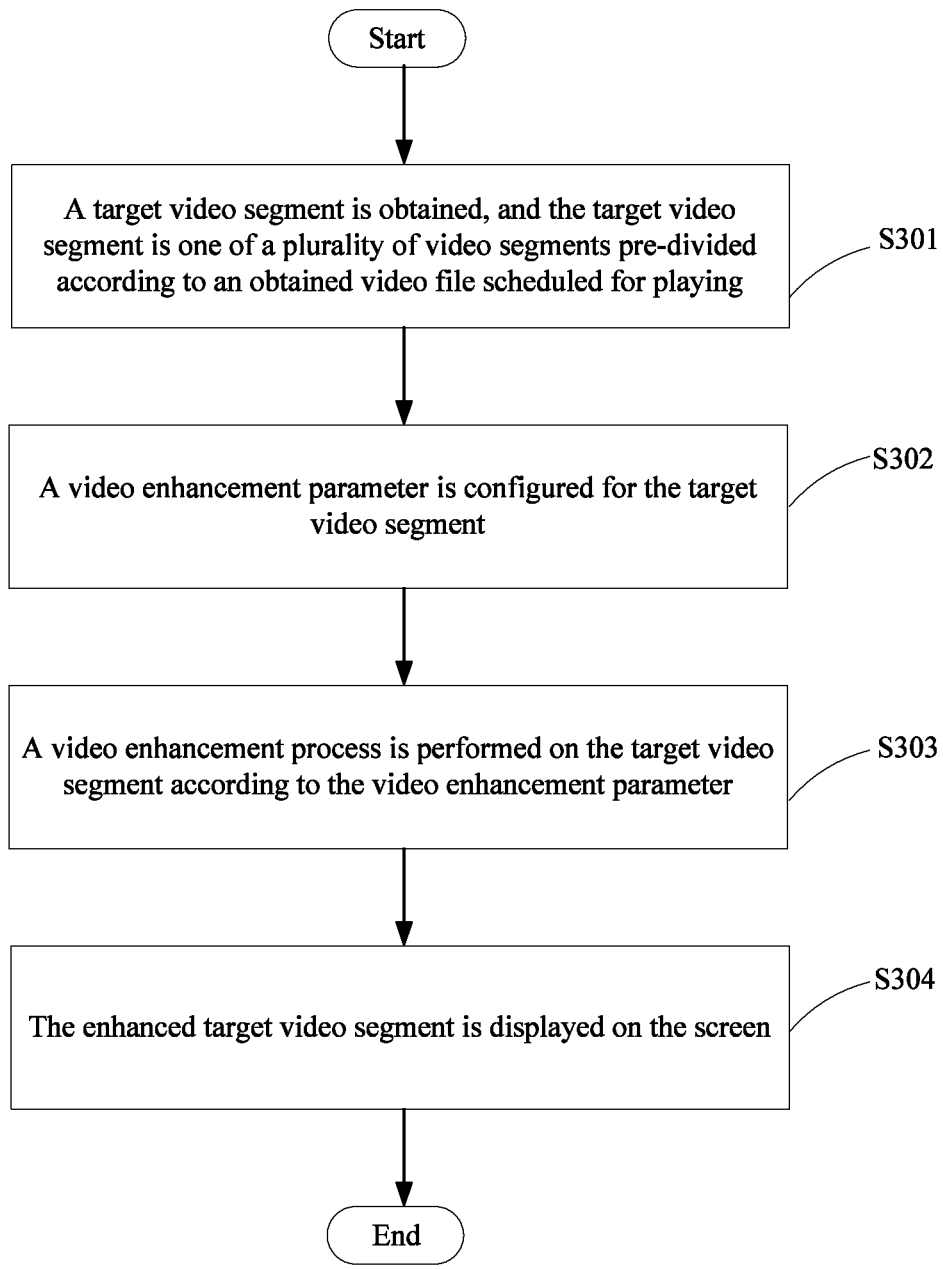
FIG. 3 illustrates a flowchart of a video processing method provided by an embodiment of the present disclosure.

However, effect of video quality is poor in the conventional video play. The inventor researches and finds out that the reason of the poor effect is lack of enhancement optimization of the video data. As such, an embodiment of the present disclosure provides a video processing method to solve the technical problem. The method is for an image processor of an electronic device and used for increasing video effect when a video is displayed. Details of the video processing method can be referred to FIG. 3. The method includes S301-S304.

In S301, a target video segment is obtained. The target video segment is one of a plurality of video segments pre-divided according to an obtained video file scheduled for playing.

In detail, when a video is displayed, the electronic device can determine the video file scheduled for playing. As an implementation, the electronic device includes a plurality of client sides capable of playing the video file. A video list interface is disposed in the client sides. The video list interface of the client sides displays display content corresponding to a plurality of videos. The display content corresponding to the plurality of videos includes thumbnails corresponding to the plurality of videos. Each of the thumbnails can be used as a touch button. When a user clicks one thumbnail, a corresponding client side can detect the thumbnail which the user clicks. That is, the corresponding client side can determine an on-line video file scheduled for playing.

In response to the video which the user selects from a video list, the client side enters a display interface of the video. A play button of the display interface is clicked. The client side can detect a type of the video which the user selects by monitoring a touch operation of the user. In detail, the play button has a predefined property. The video scheduled for playing which is selected by the use can be determined by detecting the property of the play button corresponding to the obtained touch operation.

Then, after the electronic device obtains an identification of the video scheduled for playing, the electronic device looks up, according to the identification, whether the identification is included in a local storage space of the electronic device. When the identification is included in the local storage space of the electronic device, it is determined that the video file scheduled for playing is stored locally. When the identification is not included in the local storage space of the electronic device, the video file scheduled for playing is downloaded, according to a network address corresponding to the identification, from a server corresponding to the network address.

After the video file scheduled for playing is obtained, the video file scheduled for playing is divided into the plurality of video segments according to a predefined strategy. As an implementation, the video file scheduled for playing is divided into the plurality of video segments according to a predefined time interval. For example, one video segment is divided every 5 minutes, so that the video file scheduled for playing is divided into the plurality of video segments. As another implementation, the video file scheduled for playing includes a plurality of sub-video files which are sequentially merged. For example, an ending time point of one sub-video file is a starting time point of another sub-video file. The video file scheduled for playing is divided into the plurality of video segments according to the plurality of sub-video files.

In S302, a video enhancement parameter is configured for the target video segment.

After the plurality of video segments are obtained, a video enhancement parameter can be configured for each of the plurality of video segments according to a predefined rule, as shown in Table 1.

TABLE 1

| video file scheduled for playing | |
|---|---|
| video segment 1 | video enhancement parameter 1 |
| video segment 2 | video enhancement parameter 2 |
| video segment 3 | video enhancement parameter 3 |
| video segment 4 | video enhancement parameter 4 |

The video enhancement parameter of each of the plurality of video segments can be set in advance. Accordingly, each of the plurality of video segments of the video file scheduled for playing can correspond to one video enhancement parameter. The video segment 1, the video segment 2, and the video segment 3 are identifications of the video segments. After the target video segment is obtained, the identification of the target video segment is determined. Then, the video enhancement parameter corresponding to the target video segment can be determined according to a corresponding relationship of the video segments and the video enhancement parameters in the above table.

In detail, the identification of each video segment can be a segment name, description information or the like. The description information can be a description of content of each video segment, for example, an outline of a drama or the like.

In S303, a video enhancement process is performed on the target video segment according to the video enhancement parameter.

In detail, the video enhancement parameter can be an optimization parameter of image data in a video frame. As an implementation, performing the video enhancement process on the target video segment according to the video enhancement parameter includes performing an image parameter optimization on the target video segment according to the video enhancement parameter. The image parameter optimization is used for optimizing video quality of the target video segment. The video quality includes parameters of the definition, sharpness, lens distortion, color, resolution, gamut range, and purity for determining the viewing effect of the video. Different combination of the parameters can implement different display enhancement effects. For example, a horrible effect can be established by implementing a barrel distortion on a center at which a portrait is located and adjusting a tone of a current image to be gray.

In the embodiment of the present disclosure, the image parameter optimization includes at least one of exposure enhancement, noise reduction, edge sharpness, contrast enhancement, and saturation increment.

The exposure enhancement is used for increasing brightness of an image. The brightness value in an area with a low brightness value can be increased by a histogram. Moreover, the brightness of the image can be increased via non-linear iterations. In detail, I represents a darker image required to be processed, and T represents a brighter image after being processed. The method of the exposure enhancement is $T(x)=I(x)+(1-I(x))*I(x)$. T and I are both images with values of [0,1]. When the effect is poor for one time, multiple iterations can be executed.

Noise reduction of data of an image is used for removing noises of the image. In detail, during the generation and transmission process, the image is often disturbed and affected by various noises to decrease quality of the image. This produces negative effects for the following image processing and image visual effects. There are many types of noises, such as electrical noises, mechanical noises, channel noises, and other noises. Accordingly, in order to suppress the noises, improve the quality of the image, and facilitate a higher-level processing, the image must be pre-processed for noise reduction. From probability distribution of the noises, the noises can be divided into Gaussian noises, Rayleigh noises, gamma noises, exponential noises, and uniform noises.

In detail, a Gaussian filter can be used to denoise the image. The Gaussian filter is a linear filter which can effectively suppress the noises and smooth the image. A functional principle of the Gaussian filter is similar to a functional principle of a mean filter. Both of them use an average value of pixels in a filter window as an output. Coefficients of a window template of the Gaussian filter are different from coefficients of a window template of the mean filter. The coefficients of the template of the mean filter are the same value "1". The coefficients of the template of the Gaussian filter are decreased with increments of distances with respect to a center of the template. Therefore, a degree of blurring of the image by the Gaussian filter is smaller than a degree of blurring of the image by the mean filter.

For example, a 5×5 Gaussian filter window is generated, and a center position of a template is used as a coordinate origin for sampling. A coordinate of each position of the template is brought into the Gaussian function, and obtained values are the coefficient of the template. The image can be denoised by performing a convolution on the Gaussian filter window and the image.

The edge sharpness is used for making a blurred image clearer. The edge sharpness generally includes two methods. One is differentiation, and the other is high-pass filtering.

The contrast enhancement is used for enhancing the image quality of the image, so that colors in the image are more vivid. In detail, contrast stretching is one enhancement method of the image, and it also belongs to a grayscale transformation operation. Through the grayscale transformation, the grayscale value is stretched to the entire of an interval 0-255. The contrast is enhanced apparently and significantly. The following formula can be used for mapping a grayscale value of a pixel to a larger grayscale space:

$$I(x,y)=[(I(x,y)-I\min)/(I\max-I\min)](MAX-MIN)+MIN.$$

Imin and Imax are a minimum grayscale value and a maximum grayscale value of an original image, and MIN and MAX are a minimum grayscale value and a maximum grayscale value of a grayscale space to be stretched.

Figure 4:
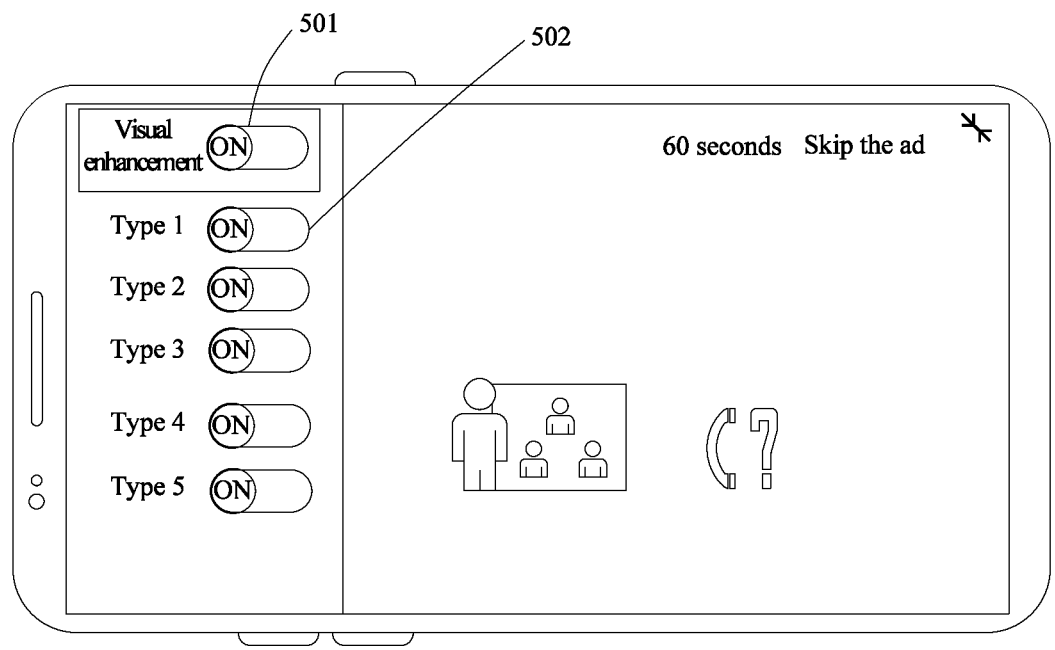
FIG. 4 illustrates a to-be-optimized type selection interface provided by an embodiment of the present disclosure.

In detail, a user can set a to-be-optimized type for the video file scheduled for playing in the electronic device. The to-be-optimized type can be a type of a target object, for example, a male, a female, a sky, a mountain, a river, a signboard, or the like. In detail, the user can input the to-be-optimized type in the video play interface. As shown in FIG. 4, a main switch 501 for video enhancement and sub-switches 502 for each type of the target objects are displayed on the video interface. In detail, the main switch 501 for video enhancement is used for turning on or off a video enhancement function. The video enhancement function is used for optimizing the image data of the video file. When the main switch 501 for video enhancement is turned on, the user can select to turn on one or some of the sub-switches 502 of the types of target objects. As shown in FIG. 4, type 1 corresponds to one type of a target object, for example, a male, and type 2 corresponds to another type of a target object, for example, a female. Type 1 and type 2 are example texts. In detail, the text can be changed according to a specific type of a target object in practical applications. For example, type 1 is changed to a male character.

When the main switch 501 for video enhancement is turned on, the user selects to turn on the to-be-optimized type of the target object which is required to be optimized, that is, to turn on the sub-switch 502 of the to-be-optimized type which is required to be optimized. The electronic device can obtain the video file corresponding to the to-be-optimized type of target object.

When the main switch 501 for video enhancement is turned off, the sub-switches 502 corresponding to each type in a to-be-optimized type selection window are grayed out. That is, the sub-switches 502 cannot be selected to be turned on or off, that is, the sub-switches 502 do not respond to an operation of an application.

Figure 5:
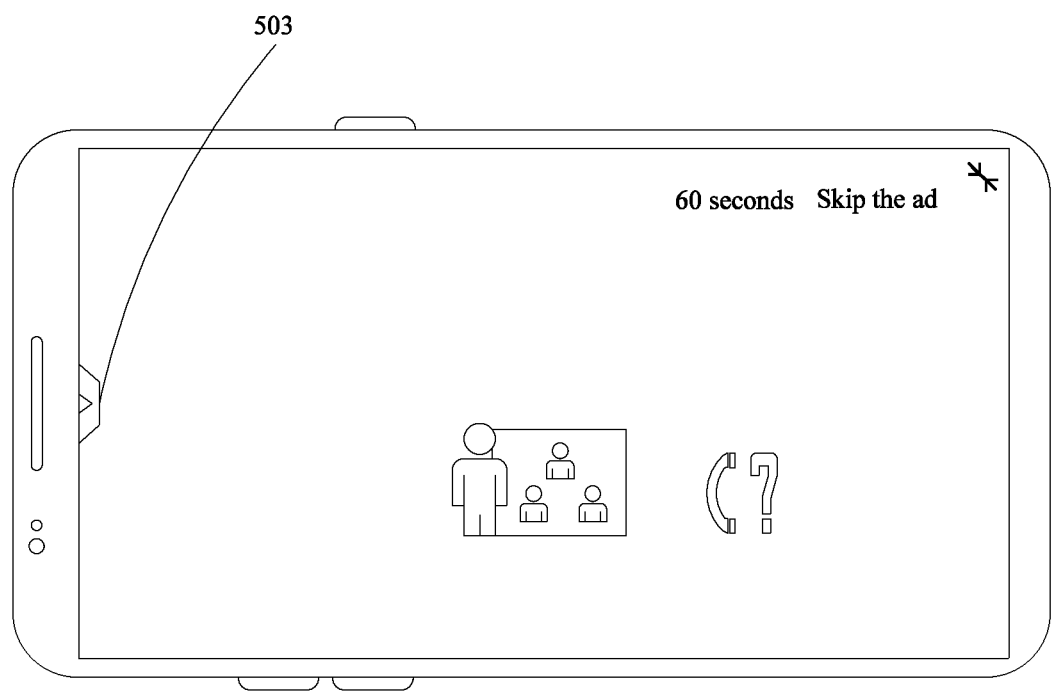
FIG. 5 illustrates a hidden effect of the to-be-optimized type selection interface provided by an embodiment of the present disclosure.

Furthermore, the to-be-optimized type selection interface shown in FIG. 4 can be hidden. In detail, as shown in FIG. 5, a sliding button 503 is provided on one side of the to-be-optimized type selection window. The to-be-optimized type selection window can be hidden and slide out via the sliding button 503. As an implementation, when the to-be-optimized type selection window is hidden, the to-be-optimized type selection window is slid out by clicking the sliding button 503. When the to-be-optimized type selection window is slid out, the to-be-optimized type selection window can be hidden by clicking the sliding button 503.

Furthermore, when a to-be-optimized type is selected, the user can input an indication of an optimization degree. Based on the indication of the optimization degree, the optimization degree of the type can be adjusted. For example, when the exposure enhancement is selected, the user inputs an indication of a degree of the exposure enhancement by an input interface or pressing a volume key. For example, pressing a volume up key each time increases the degree of the exposure enhancement by 2%. Correspondingly, pressing a volume down key each time decreases the degree of the exposure enhancement by 2%. The user can freely adjust the degree of optimization.

In S304, the enhanced target video segment is displayed on the screen.

The target video segment can be displayed after the video enhancement process which is an on-screen rendering method. In detail, the target video segment can be decoded to obtain a plurality of video frames, and then the plurality of video frames are stored in the frame buffer. After the plurality of video frames of the target video segment are processed in the frame buffer, they are displayed on the screen according to a refresh rate of the screen.

As another implementation, the video enhancement processing can be performed on the target video segment by an off-screen rendering method. In detail, the graphics processor is invoked to decode the target video segment to obtain a plurality of video frames.

In detail, the decoding method includes hard decoding and soft decoding. The client sides can select the hard decoding or the soft decoding to decode the target video segment.

In an embodiment of the present disclosure, the target video segment is decoded by the hard decoding to obtain the plurality of video frames. That is, a hardware module of the graphics processor is invoked to decode the target video segment to obtain the plurality of video frames.

The plurality of video frames are transmitted to an off-screen rendering buffer.

As an implementation, an off-screen rendering buffer is established in the GPU in advance. In detail, the GPU invokes a rendering client module to render and compose image data of the plurality of frames to be rendered and transits the same to the screen for display. In detail, the rendering client module can be an OpenGL module. A final position of rendering pipelines by the OpenGL is in the frame buffer. The frame buffer is a series of two-dimensional pixel storage array including a color buffer, a depth buffer, a template buffer, and an accumulation buffer. By default, OpenGL uses the frame buffer provided by the window system. In a default situation, the frame buffer used by OpenGL is provided by a window system.

GL_ARB_framebuffer_Object of OpenGL expands to provide a method for establishing an additional frame buffer object (FBO). OpenGL can use FBO to redirect the frame buffer which is originally drawn to the window to FBO.

Another buffer, that is, the off screen rendering buffer, is established outside the frame buffer via FBO. Then, the obtained plurality of video frames are stored in the off-screen rendering buffer. In detail, the off-screen rendering buffer can be a storage space corresponding to the graphics processor. That is, the off-screen rendering buffer per se has no space for storing images. After the off-screen rendering buffer is mapped to a storage space in the graphics processor, the images are stored in the storage space in the graphics processor corresponding to the off-screen rendering buffer.

By binding the plurality of video frames to the off-screen rendering buffer, the plurality of video frames can be stored in the off-screen rendering buffer. That is, the plurality of video frames can be looked up in the off-screen rendering buffer.

The graphics processor is indicated to perform the video enhancement process on the plurality of video frames in the off-screen rendering buffer.

The plurality of video frames are optimized by performing a convolution on feature data corresponding to a video enhancement algorithm and the plurality of video frames to be rendered. In detail, the plurality of video frames in the off-screen rendering buffer are optimized by rendering the rendering objects and data texture objects. That is, an operation of render to texture (RTT) is performed. The rendering objects are the plurality of video frames. In detail, the plurality of video frames can be stored in FBO via the rendering objects. The rendering objects can be served as a variable to assign the plurality of video frames to the rendering objects, and then the rendering objects are bound to FBO to store the plurality of video frames in the off-screen rendering buffer. For example, a handle is established in FBO, and the handle points to the plurality of video frames. The handle can be a rendering object.

Values of the video enhancement algorithm are assigned to the texture objects. The feature data corresponding to the video enhancement algorithm is the parameters of the video enhancement algorithm, for example, parameters in a median filter in the noise reduction. The specific operation of the video enhancement algorithm can be referred to the above embodiment.

The plurality video frames are transmitted to the frame buffer and displayed on the screen after the video enhancement process is performed.

The frame buffer, for example, the frame buffer as shown in FIG. 2, corresponds to the screen and is used for storing data required to be displayed on the screen. The frame buffer is a driver program interface which appears in an operating system kernel. Taking an Android system as an example. Linux works in a protected mode, so a user mode process cannot use an interrupt call provided by display card BIOS to directly write data and display it on the screen like a DOS system. Linux abstracts the frame buffer device for the user process to directly write data and display it on the screen. A mechanism of the frame buffer simulates the function of the display card. Memory of the display card can be operated directly by reading and writing of the frame buffer. In detail, the frame buffer can be regarded as an image of the memory of the display. After the frame buffer is mapped to a process address space, reading and writing operations can be performed directly and the written data can be displayed on the screen.

The frame buffer can be regarded as a space for storing data. The CPU or the GPU puts the data to be displayed into the frame buffer. The frame buffer itself does not have any ability to calculate data. The video controller reads the data in the frame buffer according to the refresh rate of the screen and displays the data on the screen.

In detail, when the rendering objects are bound to the frame buffer, the rendering objects have been optimized by the video enhancement algorithm. That is, the rendering objects are the optimized video frames of the video file scheduled for playing. Then, the optimized video frames of the video file scheduled for playing are transmitted to the frame buffer and stored.

As an implementation manner, the graphics processor reads the image data from the frame buffer frame-by-frame according to the refresh rate of the screen, and then displays the image data on the screen after the rendering and composite processing.

Accordingly, compared with a situation that the video frames are stored in the frame buffer and the video enhancement operation is performed in the frame buffer, the off-screen rendering method in which the plurality of video frames of the video file scheduled for playing are optimized and then transmitted to the frame buffer, so that the data in the frame buffer is data after the video enhancement process, can avoid that user experiences are affected when the video frames in the frame buffer which are not optimized are directly displayed on the screen due to the refresh rate of the screen.

Figure 6:
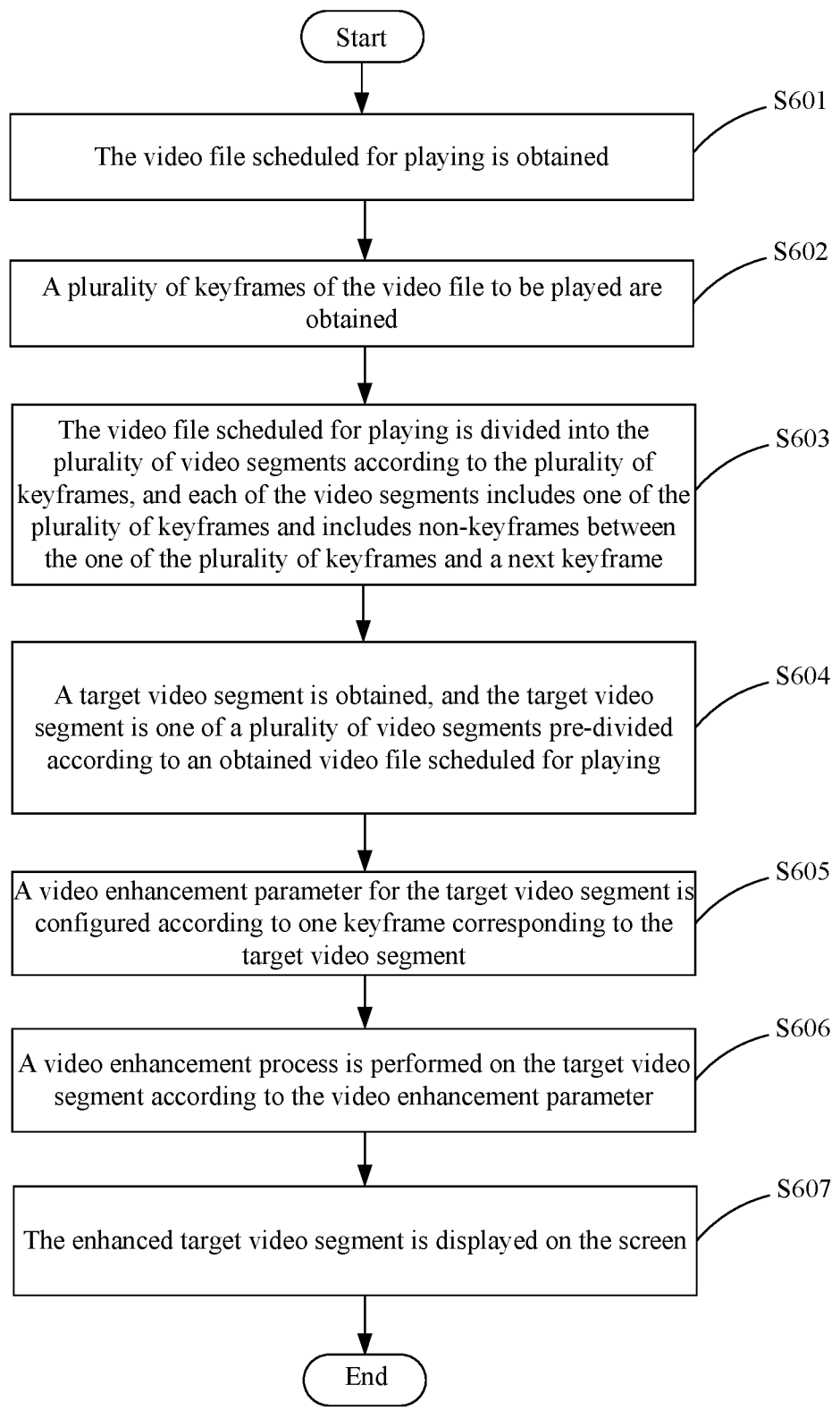
FIG. 6 illustrates a flowchart of a video processing method provided by another embodiment of the present disclosure.

Furthermore, the plurality of video segments can be divided according to keyframes, and the video enhancement parameter configured for each video segment can be set according to one of the keyframes. Details are referred to FIG. 6. The method includes S601 to S607.

In S601, the video file scheduled for playing is obtained.

In S602, a plurality of keyframes of the video file scheduled for playing are obtained.

One frame is a most basic unit for video production. Each wonderful video is composed of multiple carefully captured frames. Each frame on the timeline can contain all the content required to be displayed and include graphics, sound, various materials, and many other objects.

The keyframes, as the name suggests, refer to frames with key content. The keyframes are frames used for defining a change of the video and changing a state, that is, are frames in which an instance object exists on an editing stage and can be edited. The keyframes are frames when you need to move or change an object. A first keyframe is a starting state of the object, a second keyframe is an ending state of the object, and middle frames represent a change process of the object from the first keyframe to the second keyframe.

Except for the keyframes, all the other frames can be non-keyframes. In detail, the non-keyframes can include blank frames and normal frames. A blank frame is a frame which does not contain the content of an instance on a stage. A normal frame is a frame in which an instance object can be displayed on the timeline but an editing operation cannot be performed on the instance object.

In S603, the video file scheduled for playing is divided into the plurality of video segments according to the plurality of keyframes. Each of the video segments includes one of the plurality of keyframes and includes non-keyframes between the one of the plurality of keyframes and a next keyframe.

Each keyframe corresponds to a play time point of the video file scheduled for playing. The video file scheduled for playing can be divided into the plurality of video segments based on the play time point corresponding to each of the plurality of the keyframes. For example, two adjacent keyframes are used as a video segment, and next two adjacent keyframes are used as a next video frame. For example, the video file scheduled for playing includes a first keyframe, a second keyframe, a third keyframe, and a fourth keyframe. The first keyframe, the second keyframe, and non-keyframes between the first keyframe and the second keyframe constitute a first video segment. The third keyframe, the fourth keyframe, and non-keyframes between the third keyframe and the fourth keyframe constitute the second video segment. As another implementation, the first keyframe and the non-keyframes between the first keyframe and the second keyframe constitute a first video segment. The second keyframe and non-keyframes between the second keyframe and the third keyframe constitute a second video segment. The third keyframe and the non-keyframes between the third keyframe and the fourth keyframe constitute a third video segment. The fourth keyframe and non-keyframes after the fourth keyframe constitute a fourth video segment.

In S604, a target video segment is obtained. The target video segment is one of a plurality of video segments pre-divided according to an obtained video file scheduled for playing.

In S605, a video enhancement parameter for the target video segment is configured according to one keyframe corresponding to the target video segment.

Differences of different keyframes are larger. The keyframe corresponding to the target video segment can represent most of the video content in the target video segment, and thus the video enhancement parameter for the target video segment can be configured according to the one keyframe corresponding to the target video segment. In detail, when the keyframe is an image, a specific implementation of configuring the corresponding video enhancement parameters for the target video segment according to the one keyframe corresponding to the target video segment can include obtaining a category of the one keyframe corresponding to the target video segment; and determining, according to a predefined corresponding relationship of the category and the video enhancement parameter, the video enhancement parameter of the one keyframe corresponding to the target video segment.

In detail, a target object in the image is identified, and the target object is classified. In detail, the target object can be obtained by a target detection algorithm or a target extraction algorithm. Specifically, all contour line information in the image collected by an image acquisition device via a target extraction or clustering algorithm, and then the category of the object corresponding to each contour line is looked up in a pre-learned model. The pre-learned model corresponds to a matching database. The matching database stores information of multiple contour lines and a category corresponding to information of each multiple contour lines.

The categories include a human body, an animal, a mountain, a river, a lake, a building, a road, or the like.

For example, when the target object is an animal, the contour and feature information of the target object, such as ears, horns, ears, and limbs, can be collected. When the target object is a human body, facial feature extraction can be performed on the target object. A method of the facial feature extraction can include a knowledge-based representation algorithm or a representation method based on algebraic features or statistical learning.

In the above-mentioned method, the video enhancement parameter is determined according to the type of the target object corresponding to the keyframe. The target object can be a moving object in the keyframe.

In addition, the above-mentioned target object can also be scene content. Configuring the corresponding video enhancement parameter for the target video segment according to the one keyframe corresponding to the target video segment includes obtaining the one keyframe corresponding to the target video segment; determining scene content corresponding to the one keyframe; and configuring the video enhancement parameter for the target video segment according to the scene content.

In detail, the scene content of the keyframe in the target video can be obtained according to a Kalman filter method or a Gaussian mixture model method. In detail, the corresponding video enhancement parameter is determined according to a category corresponding to the scene content, and the category of the scene content can include an indoor scene and an outdoor scene. The outdoor scene further includes a mountain, a street scene, a square, a sea, or the like. Different outdoor categories correspond to different video enhancement parameters. In detail, a sky, a river, and a mountain in an indoor video file do not need to be optimized, since the video file rarely relates to the scenes of the sky, the river, and the mountain. The video enhancement parameters of the outdoor scenes can be predefined according to the categories. For example, the categories of the scene content and the video enhancement parameters are shown in Table 2 below.

TABLE 2

| category of scene content | video enhancement algorithm |
| --- | --- |
| scenery | exposure enhancement, noise reduction, and contrast enhancement |
| street scene | exposure enhancement, noise reduction, edge sharpness, contrast enhancement, and saturation increment |
| sea | exposure enhancement, noise reduction, and edge sharpness |

In detail, in the street scene, because the environment is more complex and can include crowds, vehicles, billboards, or the like, more elements are contained. Accordingly, types of the video enhancement operations are more. However, in the scenery and the sea, colorful things, such as the sea, the sky, the sea, and the plant are included, but a human contour is not obvious. More attention is paid to whether colors are more vivid and light is brighter. Accordingly, the corresponding video enhancement parameters include the exposure enhancement, the noise reduction, and the contrast enhancement.

The video enhancement parameter can be determined according to the type of the target object in the keyframe, or the video enhancement parameter can be determined according to the scene content corresponding to the keyframe. As an implementation, a touch gesture on the screen can be detected before the target video segment is played.

A first time point of obtaining a target frame image is recorded. The first time point represents a time point of executing, in a current round, the method. In detail, after the electronic device decodes the video file, a plurality of frame images corresponding to the video file are obtained. Then, the frame images are rendered and displayed frame-by-frame. The first time point indicates to start the process of rendering and displaying the target frame image. In the current round, the image data in a region of the target object in each image meeting a predefined condition is optimized.

In detail, when the video file is played on the screen of the electronic device, the electronic device continuously monitors a user's touch gesture on the screen. When an input of the touch gesture is detected, a second time point of the input of the touch gesture and a target position of the screen corresponding to the touch gesture are recorded and stored in a touch gesture recording table.

Furthermore, misjudgment detection of the touch gesture might exist. That is, the user accidentally touches the screen instead of continuously pressing a certain area of the screen, that is, instead of selecting a certain area of the screen. Duration of the touch gesture on the screen can be identified after the touch gesture on the screen is detected. When the duration is greater than a predefined time length, the touch gesture is identified to be valid. When the duration is less than or equal to the predefined time length, the touch gesture is discarded. The touch gesture which is identified to be valid can continue to perform the operation of identifying the target position of the screen corresponding to the touch gesture. The predefined time length is a time length which is set according to requirements by the user, for example, 1 to 3 seconds.

The electronic device uses a time point of starting to play the video file as a starting point and looks up, according to the first time point, all touch gestures within the starting time point and the first time point.

In detail, the target position corresponding to the touch gesture is identified according to the above-mentioned touch gesture recording table. In detail, the screen can set the position according to each independent touch unit (which can be a touch capacitance, etc.) on the touch screen. For example, a leftmost touch unit on top of the screen is used as the starting point. Then, a horizontal and vertical coordinate system is established. Each coordinate in the coordinate system can be identified according to the arrangement of the touch units. For example, the coordinate of (10, 20) represents a tenth touch unit in the horizontal position and a twentieth touch in the vertical position.

When the user touches the screen and the input touch gesture can be sensed by the touch unit in a certain area of the screen, the position of the touch unit which senses the touch gesture is the target position of the screen corresponding to the touch gesture.

Obtaining the time of detecting the touch gesture, the image displayed on the screen, and the selected target object corresponding to the target position in the image can identify that the target object selected by the user is a moving object or scene content, thereby selecting the video enhancement parameter corresponding to the moving object or the scene content to perform the video enhancement process.

Furthermore, requirements for brightness are different in considering indoor and outdoor situations. The brightness is lower in the indoor condition, while the brightness is generally greater in the outdoor condition. The video enhancement parameter includes a brightness parameter. The brightness parameter can be the above-mentioned exposure enhancement and used for increasing the brightness of the quality of the video. Configuring the video enhancement parameter for the target video segment according to the scene content of the one keyframe includes determining whether a category of the scene content corresponding to the one keyframe is indoor or outdoor; configuring a first brightness parameter for the target video segment when the category is indoor; and configuring a second brightness parameter for the target video segment when the category is outdoor. The first brightness parameter is used for setting a brightness of the target video segment as a first brightness value. The second brightness parameter is used for setting the brightness of the target video segment as a second brightness value. The first brightness value is greater than the second brightness value.

In detail, after the scene content is extracted from the keyframe, the scene content is matched with a predefined data set. The data set includes multiple scene pictures. Each scene picture is marked as an indoor tag or an outdoor tag. Then, the scene content is compared with each scene picture in the data set to look up whether the scene content corresponds to an indoor tag or an outdoor tag. When the scene content corresponds to the indoor tag, the first brightness parameter is set for the target video segment. When the scene content corresponds to the outdoor tag, the second brightness parameter is set for the target video segment.

In detail, when the scene content corresponds to the indoor tag, a brightness value of the target video segment is obtained and it is determined whether the brightness value is greater than or equal to the first brightness parameter. When the brightness value is smaller than the first brightness parameter, the brightness value of the target video segment is adjusted according to the first brightness parameter so that the brightness value of the target video segment reaches a brightness value corresponding to the first brightness parameter. Similarly, when the scene content corresponds to the outdoor tag, the brightness value of the target video segment is adjusted to a brightness value corresponding to the second brightness parameter. The first brightness value is greater than the second brightness value. This is because the light in the indoor scene is dark and the light in the outdoor scene is sufficient. When the user watches the video in the indoor scene, the brightness is adjusted to be increased to prevent the quality from being affected due to the low brightness.

Furthermore, the user's pupils are enlarged in a dim environment in considering that the user is in the dim environment, such as a room without light in a cloudy day. When the brightness is too high, the user's eyes are hurt. An implementation of configuring the video enhancement parameter for the target video segment according to the scene content of the one keyframe includes obtaining a brightness of current environmental light of the electronic device; determining whether the brightness of the environmental light is lower than a predefined brightness value; determining whether the category of the scene content corresponding to the one keyframe is indoor or outdoor when the brightness of the environmental light is lower than the predefined brightness value; configuring a third brightness parameter for the target video segment when the category is indoor; and configuring a fourth brightness parameter for the target video segment when the category is outdoor. When the brightness of the current environmental light is greater than or equal to the predefined brightness value, it is determined whether the category of the scene content corresponding to the one keyframe is indoor or outdoor. When the category is indoor, the first brightness parameter is configured for the target video segment. When the category is outdoor, the second brightness parameter is configured for the target video segment.

In detail, the third brightness parameter is used for setting the brightness of the target video segment as a third brightness value, the fourth brightness parameter is used for setting the brightness of the target video segment as a fourth brightness value, and the third brightness value is greater than the fourth brightness value. In detail, a relationship of the first brightness parameter, the second brightness parameter, the third brightness parameter, and the fourth brightness parameter is that the first brightness parameter is greatest and followed by the second brightness parameter, the third brightness parameter, and the fourth brightness parameter. The third brightness parameter and the fourth brightness parameter are smaller than a predetermined brightness value. As such, not only the brightness values in the indoor scene and the outdoor scene can be distinguished to increase the brightness of the quality in the indoor scene, but also the brightness of the quality of the target video segment can be set in considering the brightness of the current environmental light.

As another implementation, when the scene content corresponding to the one keyframe is outdoor, different filters can be set according to outdoor weather conditions. In detail, the video enhancement parameter includes a filter effect parameter. Configuring the video enhancement parameter for the target video segment according to the scene content of the one keyframe includes determining whether a category of the scene content corresponding to the one keyframe is outdoor; obtaining weather information corresponding to the scene content when the category is outdoor; and configuring the filter effect parameter for the target video segment according to the weather information.

In detail, a method of obtaining the weather information of the outdoor scene can include obtaining a scene image of the one keyframe corresponding to the target video segment; and determining the weather information corresponding to the scene image according to a preset database or a machine learning algorithm. The weather information includes a weather category, for example, sunny, rainy, cloudy, and snowy. Different weather conditions can correspond to different filter effects.

In Android, a system uses a color matrix-ColorMatrix to process the color effects of the image. For each pixel of the image, there is a color component matrix to store the RGBA values of colors. The color matrix in Android is a 4×5 digital matrix which is used for processing the colors of the image.

$$A = \begin{bmatrix} a & b & c & d & e \\ f & g & h & i & j \\ k & l & m & n & o \\ p & q & r & s & t \end{bmatrix}$$

$$C = \begin{bmatrix} R \\ G \\ B \\ A \\ 1 \end{bmatrix}$$

A is a 4×5 color matrix, and C is a color component matrix. In the Android system, a matrix multiplication operation can be used for modifying values of the color component matrix to change the color display effect of an image. In Android, [a, b, d, e, f, g, h, i, j, k, l, m, n, o, p, q, r, s, t] is stored in the form of a one-dimensional array, and C is a color matrix component. When the image is processed, the matrix multiplication operation AC is used for processing the color component matrix.

R, G, and B are color components, and A is an offset. Adjusting R, G, B, and A can obtain different filter effects. For example, when A is the following formula, a grayscale effect can be obtained.

$$A = \begin{bmatrix} 0.33 & 0.59 & 0.11 & 0 & 0 \\ 0.33 & 0.59 & 0.11 & 0 & 0 \\ 0.33 & 0.59 & 0.11 & 0 & 0 \\ 0 & 0 & 0 & 1 & 0 \end{bmatrix}$$

Different filter effects can be set for different weather information. For example, when the light of the weather is not enough, such as cloudy or rainy, a grayscale effect or a nostalgic effect can be set. The filter effect can be preset. Different filter effects correspond to different color components and offsets to achieve different qualities. For example, when the image has no color under the nostalgic effect (under the grayscale effect), the image has a blurred effect and a yellowish visual effect like an old photo. When the light is insufficient, using this effect can establish a nostalgic and literary atmosphere. When the light is sufficient, for example, a sunny day, a vivid filter can be configured for the target video segment, thereby increasing the sharp contrast of each color in the video to make the sun brighter and the colors of flowers and grass more vivid.

Furthermore, when the category of the scene content is outdoor, an architectural style corresponding to the scene content can be identified. In detail, scenes without buildings or scenes with less architectural content can be excluded. Then, building content in the scene content is extracted to identify the architectural style corresponding to the building content, and a filter effect is configured for the video segment according to the architectural style. For example, when the architectural style is a European style, a gray filter can be configured to achieve a nostalgic effect.

Furthermore, a location corresponding to a building can be identified when it is determined that the keyframe includes the building. For example, some buildings belong to a landmark of a place, such as the Eiffel Tower, the Great Wall, or the like. A geographic location corresponding to the scene content in the keyframe can be identified, thereby configuring the corresponding filter effect parameter for the video segment according to the geographic location. For example, when the location is the Eiffel Tower, the filter effect parameter with romantic and literary atmosphere can be configured. For example, the filter effect parameter can provide the rendering effect of a pink light source for the video content.

In S606, a video enhancement process is performed on the target video segment according to the video enhancement parameter.

In S607, the enhanced target video segment is displayed on the screen.

It is noted that detailed descriptions of the above-mentioned steps can be referred to the above-mentioned embodiments and are not repeated herein.

Figure 7:
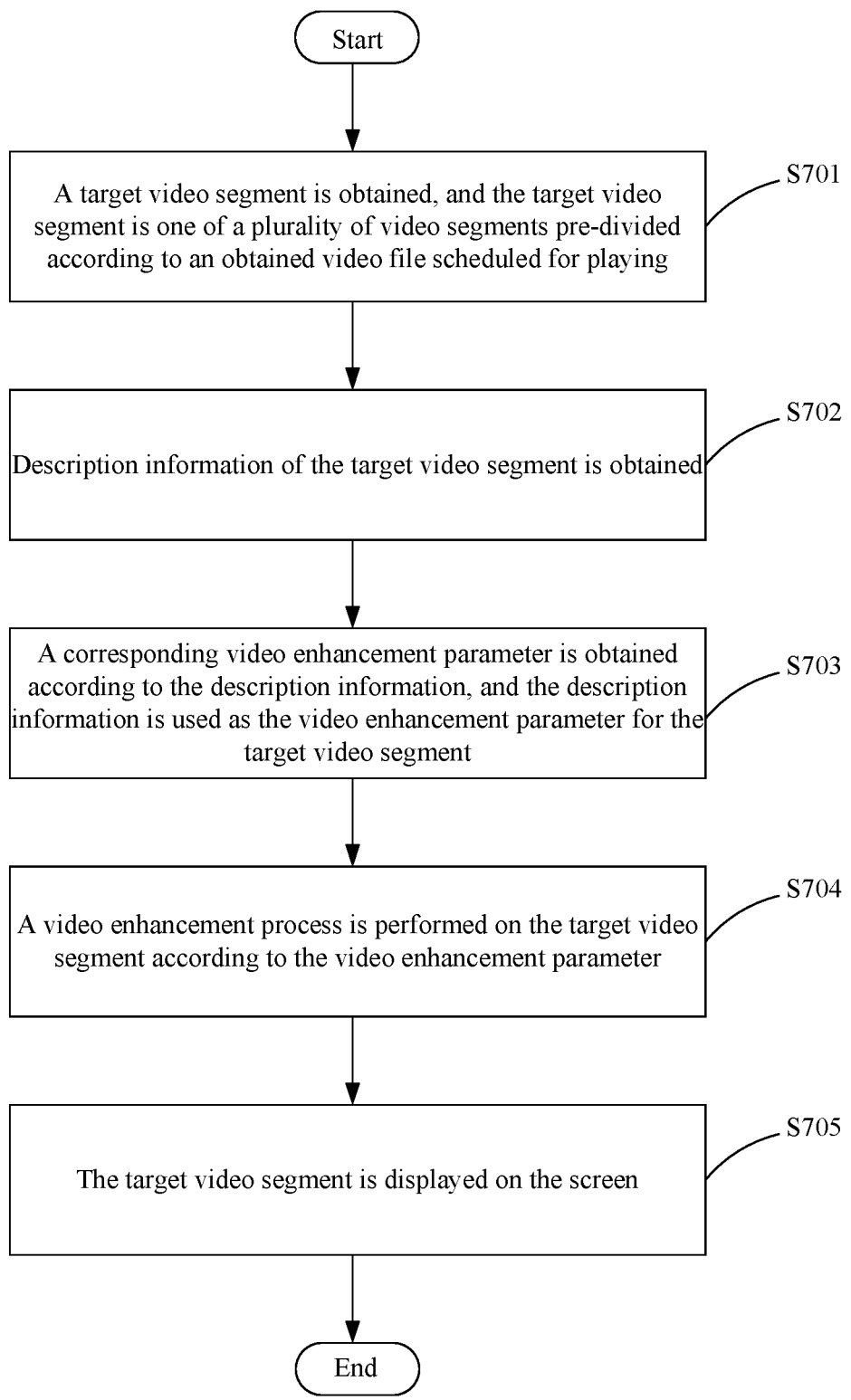
FIG. 7 illustrates a flowchart of a video processing method provided by yet another embodiment of the present disclosure.

Furthermore, the video file scheduled for playing may be divided into different video segments according to some video content in advance, and each video segment has a text description. The video enhancement parameter of each video segment can be determined according to the text description of each video segment. Details are referred to FIG. 7 which illustrates a video processing method provided by an embodiment of the present disclosure. The method includes S701 to S705.

In S701, a target video segment is obtained. The target video segment is one of a plurality of video segments pre-divided according to an obtained video file scheduled for playing.

In S702, description information of the target video segment is obtained.

Figure 8:
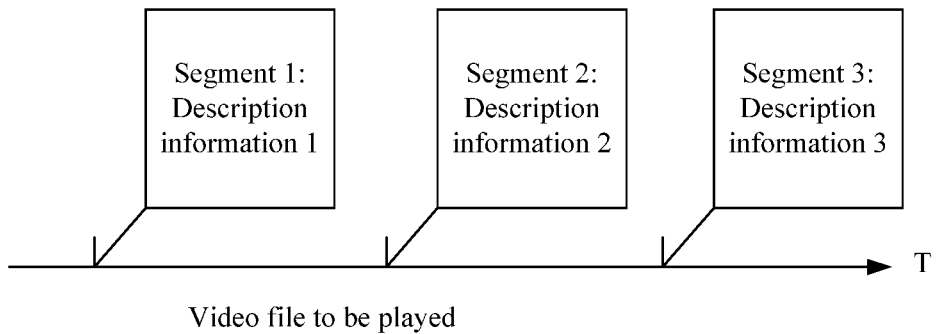
FIG. 8 illustrates video segments provided by an embodiment of the present disclosure.

The video file scheduled for playing can be composed of a plurality of sub-video files, and the plurality of sub-video files correspond to respective description information. As shown in FIG. 8, the video file scheduled for playing includes three video segments, that is, a video segment 1, a video segment 2, and a video segment 3. The video segment 1 corresponds to description information 1, the video segment 2 corresponds to description information 2, and the video segment 3 corresponds to description information 3. The description information can be used for describing abstract information of video content of video segment. For example, the description information 1 is "The second brother admits that he has betrayed the revolution, how do the third baby choose?". Alternatively, the description information can be used for describing announcement information of one program. For example, the description information 2 is "Zhang San and Li Si sing where happiness is". The description information can be displayed via a window when the user moves a mouse to an appropriate position, for example, the position specified by the video segment 1 in FIG. 8. Accordingly, when the video file scheduled for playing is analyzed, the description information corresponding to each video segment can be obtained.

In S703, a corresponding video enhancement parameter is looked up according to the description information, and the description information is used as the video enhancement parameter for the target video segment. That is, the corresponding video enhancement parameter can be looked up to be obtained.

As an implementation, after the description information is obtained, a keyword included in the description information is determined. The video enhancement parameter corresponding to the keyword in the description information of the target video segment is looked up in a predefined corresponding relationship of the keyword and the video enhancement parameter, thereby determining the video enhancement parameter of the target video segment. That is, the video enhancement parameter corresponding to the keyword in the description information of the target video segment can be looked up to be obtained.

As another implementation, a category of the video segment can be determined according to the description information. In detail, a keyword in the description information is extracted. Specifically, the description information can be segmented to obtain a plurality of fields. Then, the fields are matched with a predefined field to look up a matched field. The predefined field is a field which represents the category of the video. For example, "singing", "sing a song", or "sing" indicates that the video segment is a singing program. For example, "cross-talk", "sketch" or names of some actors can indicate that the content of the video segment is a comedy show. After the keyword of the description information is determined, the video category corresponding to the video segment can be determined, thereby determining the video enhancement parameter corresponding to the target video segment according to the video category. For example, when the light in a singing program is relatively dim, the video enhancement parameter focuses on the exposure enhancement. A cross-talk program belongs to a performance category, and the details are more important. The video enhancement parameter focuses on the sharpness to make the contour outline of a person clearer. That is, when the category of the target video segment is a singing program, the determined video enhancement parameter can exclude the sharpness but include the exposure enhancement, or the sharpness effect is poor and the exposure enhancement is higher.

In S704, a video enhancement process is performed on the target video segment according to the video enhancement parameter.

In S705, the enhanced target video segment is displayed on the screen.

It is noted that detailed descriptions of the above-mentioned steps can be referred to the above-mentioned embodiments and are not repeated herein.

Figure 9:
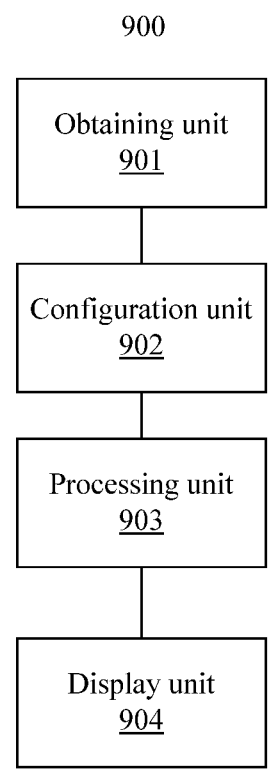
FIG. 9 illustrates a structural block diagram of a video processing apparatus provided by an embodiment of the present disclosure.

Please refer to FIG. 9 which illustrates a structural block diagram of a video processing apparatus 900 provided by an embodiment of the present disclosure. The apparatus can include an obtaining unit 901, a configuration unit 902, a processing unit 903, and a display unit 904.

The obtaining unit 901 is configured to obtain a target video segment. The target video segment is one of a plurality of video segments pre-divided according to an obtained video file scheduled for playing.

The configuration unit 902 is configured to configure a video enhancement parameter for the target video segment.

The configuration unit 902 is further configured to configure the corresponding video enhancement parameter for the target video segment according to one keyframe corresponding to the target video segment. In detail, as an implementation, the one keyframe corresponding to the target video segment is obtained, scene content corresponding to the one keyframe is determined, and the video enhancement parameter is configured for the target video segment according to the scene content of the keyframe. It is determined whether a category of the scene content corresponding to the one keyframe is indoor or outdoor. A first brightness parameter is configured for the target video segment when the category is indoor. A second brightness parameter is configured for the target video segment when the category is outdoor. The first brightness parameter is used for setting a brightness of the target video segment as a first brightness value, and the second brightness parameter is used for setting the brightness of the target video segment as a second brightness value. The first brightness value is greater than the second brightness value. It is determined whether a category of the scene content corresponding to the one keyframe is outdoor. Weather information corresponding to the scene content is obtained when the category is outdoor. A filter effect parameter is configured for the target video segment according to the weather information.

The configuration unit 902 is further configured to: obtain description information of the target video segment; and look up a corresponding video enhancement parameter according to the description information and use the same as the video enhancement parameter for the target video segment. That is, the corresponding video enhancement parameter can be looked up to be obtained.

The processing unit 903 is configured to perform a video enhancement processing on the target video segment according to the video enhancement parameter.

The display unit 904 is configured to display the enhanced target video segment on a screen.

Further, the video processing apparatus includes a dividing unit configured to: obtain the video file scheduled for playing; obtain a plurality of keyframes of the video file scheduled for playing; and divide the video file scheduled for playing into the plurality of video segments according to the plurality of keyframes. Each of the video segments includes one of the plurality of keyframes and includes non-keyframes between the one of the plurality of keyframes and a next keyframe.

Those skilled in the art may be aware that the working process of the apparatus and the units can be referred to the part of description of the method embodiment for simple and convenience and is not repeated herein.

In the embodiments provided by the present disclosure, the coupling of the modules to one another may be electrical, mechanical or other forms.

In addition, functional modules in each embodiment of the present disclosure may be integrated into one processing module, or functional modules may exist physically separately, or two or more modules may be integrated into one module. The above integrated modules can be implemented in the form of hardware or in the form of software.

Figure 10:
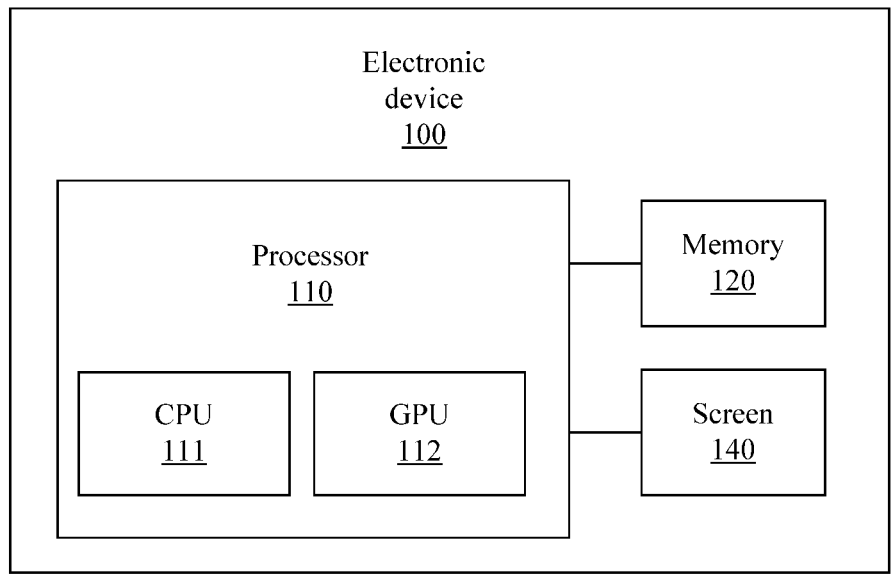
FIG. 10 illustrates a structural block diagram of an electronic device provided by an embodiment of the present disclosure.

Please refer to FIG. 10 which illustrates a structural block diagram of an electronic device provided by an embodiment of the present disclosure. The electronic device 100 may be an electronic device capable of running application programs, such as a smart phone, a tablet computer, an e-book, or the like. The electronic device 100 of the present disclosure can include one or more of the following components: a processor 110, a memory 120, a screen 140, and one or more application programs. The one or more application programs can be stored in the memory 120 and configured to be executed by the one or more processors 110. The one or more programs are configured to execute the methods described in the above-mentioned method embodiments.

The processor 110 can include one or more processing cores. The processor 110 connects every portion of the entire electronic device 100 via various interfaces and lines, and performs various functions and processes data of the electronic device 100, by executing instructions, programs, sets of codes, or sets of instructions stored in the memory 120 and invoking data stored in the memory 120. In some embodiments, the processor 110 can adopt at least one hardware form of a digital signal processing (DSP), a field-programmable gate array (FPGA), and a programmable logic array (PLA).

In detail, the processor 110 can include one or more of a central processing unit (CPU) 111, a graphics processing unit (GPU) 112, a modem, and the like. The CPU mainly deals with the operating system, user interfaces and applications. The GPU is responsible for rendering of the display content. The modem is used for processing wireless communication. It can be understood that the above modem may also not be integrated into the processor 110 and is implemented by a single communication chip.

The memory 120 can include a random access memory (RAM), and can include a read-only memory. The memory 120 can be used to store instructions, programs, codes, sets of codes, or sets of instructions. The memory 120 can include a storage program area and a storage data area. The storage program area can store instructions for implementing the operating system, instructions for implementing at least one function, instructions for implementing the method of the above described embodiments, or the like. The storage data area can store data (such as a phone book, audio and video data, chat recording data) created by the electronic device 100 during use.

The screen 140 is used for displaying information inputted by the user, information provided for the user, and various graphical user interfaces of the electronic device. These graphical user interfaces can be composed of graphics, text, icons, numbers, videos, and any combination thereof. In an example, a touch screen may be provided on a display panel to form a whole with the display panel.

Figure 11:
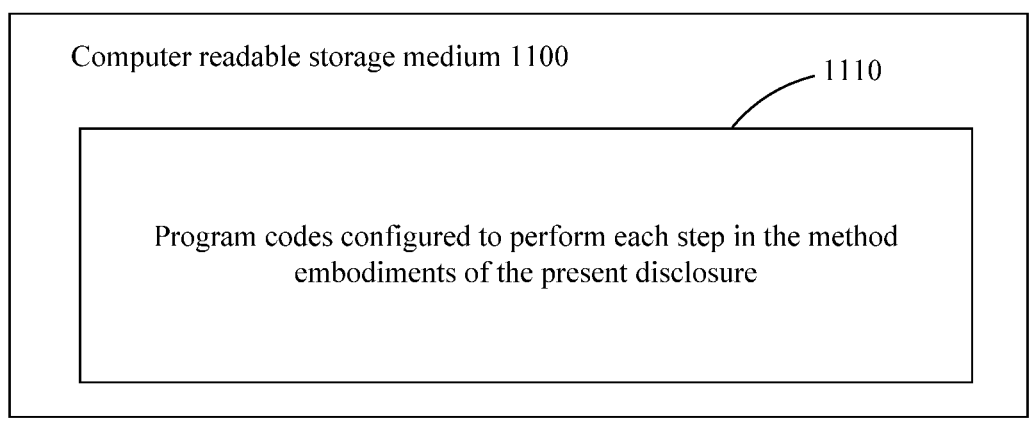
FIG. 11 illustrates a structural block diagram of a computer readable storage medium provided by an embodiment of the present disclosure.

Please refer to FIG. 11 which illustrates a structural block diagram of a computer readable storage medium provided by an embodiment of the present disclosure. Program codes are stored in the computer readable storage medium 1100, and the program codes can be invoked by the processor to execute the methods described in the above-mentioned method embodiments.

The computer readable storage medium 1100 can be an electronic memory such as a flash memory, an electrically erasable programmable read only memory (EEPROM), an EPROM, a hard disk, a ROM, or the like. In some embodiments, the computer readable storage medium 1100 includes a non-transitory computer-readable storage medium. The computer readable storage medium 1100 has a storage space for executing program codes 1110 which are configured to perform any of the method steps described above. The program codes can be read from or written to one or more computer program products. The program codes 1110 can be compressed, for example, in a suitable form.

Finally, it should be noted that the above-mentioned embodiments are only used to explain the technical solutions of the present disclosure, and are not limited thereto. Although the present disclosure is described in detail with reference to the above-mentioned embodiments, those skilled in the art understand that the technical solutions described in the above-mentioned embodiments can be modified, or some of the technical features can be equivalently replaced. The modifications and substitutions do not drive the essence of the corresponding technical solutions from the spirit and scope of the technical solutions of the embodiments of the present disclosure.

What is claimed is:

1. A video processing method, for an electronic device, the electronic device comprising a screen, the method comprising:
   obtaining a target video segment, the target video segment being one of a plurality of video segments pre-divided according to an obtained video file scheduled for playing;
   configuring a video enhancement parameter for the target video segment;
   performing a video enhancement process on the target video segment according to the video enhancement parameter; and
   displaying the enhanced target video segment on the screen;
   wherein the method further comprises:
   obtaining the video file scheduled for playing;
   obtaining a plurality of keyframes of the video file scheduled for playing; and
   dividing the video file scheduled for playing into the plurality of video segments according to the plurality of keyframes, wherein each of the video segments comprises one of the plurality of keyframes and comprises non-keyframes between the one of the plurality of keyframes and a next keyframe; and
   wherein the configuring the video enhancement parameter for the target video segment comprises:
   configuring the video enhancement parameter for the target video segment according to one keyframe corresponding to the target video segment.

2. The method of claim 1, wherein the configuring the video enhancement parameter for the target video segment according to the one keyframe corresponding to the target video segment comprises:
   obtaining a category of the one keyframe corresponding to the target video segment; and
   obtaining, based on the category of the one keyframe corresponding to the target video segment and a predefined corresponding relationship of the category and the video enhancement parameter, the video enhancement parameter corresponding to the one keyframe.

3. The method of claim 1, wherein the configuring the video enhancement parameter for the target video segment according to the one keyframe corresponding to the target video segment comprises:
   obtaining the one keyframe corresponding to the target video segment;
   determining scene content corresponding to the one keyframe; and
   configuring the video enhancement parameter for the target video segment according to the scene content of the one keyframe.

4. The method of claim 3, wherein the video enhancement parameter comprises a brightness parameter, and the configuring the video enhancement parameter for the target video segment according to the scene content of the one keyframe comprises:
   determining a category of the scene content corresponding to the one keyframe is indoor or outdoor;
   configuring a first brightness parameter for the target video segment in response to the category being indoor; and
   configuring a second brightness parameter for the target video segment in response to the category being outdoor, wherein the first brightness parameter is used for setting a brightness of the target video segment as a first brightness value, the second brightness parameter is used for setting the brightness of the target video segment as a second brightness value, and the first brightness value is greater than the second brightness value.

5. The method of claim 4, wherein the configuring the video enhancement parameter for the target video segment according to the scene content of the one keyframe comprises:
   obtaining a brightness of current environmental light of the electronic device;
   determining the category of the scene content corresponding to the one keyframe is indoor or outdoor in response to the brightness of the environmental light being lower than a predefined brightness value;
   configuring a third brightness parameter for the target video segment in response to the category being indoor; and
   configuring a fourth brightness parameter for the target video segment in response to the category being outdoor, wherein the third brightness parameter is used for setting the brightness of the target video segment as a third brightness value, the fourth brightness parameter is used for setting the brightness of the target video segment as a fourth brightness value, and the third brightness value is greater than the fourth brightness value.

6. The method of claim 3, wherein the video enhancement parameter comprises a filter effect parameter, and the configuring the video enhancement parameter for the target video segment according to the scene content of the one keyframe comprises:
obtaining weather information corresponding to the scene content in response to the category being outdoor; and
configuring the filter effect parameter for the target video segment according to the weather information.

7. The method of claim 6, wherein the obtaining the weather information corresponding to the scene content comprises:
obtaining a scene image in the scene content; and
determining the weather information corresponding to the scene content based on a predefined database or a machine learning algorithm.

8. The method of claim 6, further comprising:
obtaining an architectural style corresponding to the scene content in response to the category being outdoor; and
configuring the filter effect parameter for the target video segment according to the architectural style.

9. The method of claim 1, wherein the dividing the video file scheduled for playing into the plurality of video segments according to the plurality of keyframes comprises:
obtaining a play time point corresponding to each of the plurality of the keyframes; and
dividing the video file scheduled for playing into the plurality of video segments based on the play time point corresponding to each of the plurality of the keyframes.

10. The method of claim 1, wherein the configuring the video enhancement parameter for the target video segment comprises:
obtaining description information of the target video segment; and
obtaining the video enhancement parameter according to the description information.

11. The method of claim 1, wherein the configuring the video enhancement parameter for the target video segment comprises:
obtaining identification of the target video segment; and
obtaining, based on the identification of the target video segment and a predefined corresponding relationship of the identification and the video enhancement parameter, the video enhancement parameter corresponding to the identification of the target video segment.

12. The method of claim 1, wherein the performing the video enhancement process on the target video segment according to the video enhancement parameter comprises:
performing an image parameter optimization on the target video segment according to the video enhancement parameter, wherein the image parameter optimization is used for optimizing video quality of the target video segment.

13. The method of claim 12, wherein the image parameter optimization comprises at least one of exposure enhancement, noise reduction, edge sharpness, contrast enhancement, and saturation increment.

14. The method of claim 1, further comprising:
obtaining the video file scheduled for playing; and
dividing the video file scheduled for playing into the plurality of video segments according to a predefined time interval.

15. The method of claim 1, further comprising:
obtaining the video file scheduled for playing, the video file scheduled for playing comprising a plurality of sub-video files which are sequentially merged; and
dividing the video file scheduled for playing into the plurality of video segments according to the plurality of sub-video files.

16. An electronic device, comprising:
a screen;
at least one processor; and
at least one memory including program codes;
the at least one memory and the program codes configured to, with the at least one processor, cause the electronic device to perform:
obtaining a target video segment, the target video segment being one of a plurality of video segments pre-divided according to an obtained video file scheduled for playing;
configuring a video enhancement parameter for the target video segment;
performing a video enhancement process on the target video segment according to the video enhancement parameter; and
displaying the enhanced target video segment on the screen;
wherein the at least one memory and the program codes are configured to, with the at least one processor, cause the electronic device to further perform:
obtaining the video file scheduled for playing;
obtaining a plurality of keyframes of the video file scheduled for playing; and
dividing the video file scheduled for playing into the plurality of video segments according to the plurality of keyframes, wherein each of the video segments comprises one of the plurality of keyframes and comprises non-keyframes between the one of the plurality of keyframes and a next keyframe; and
wherein the configuring the video enhancement parameter for the target video segment comprises:
configuring the video enhancement parameter for the target video segment according to one keyframe corresponding to the target video segment.

17. A non-transitory computer-readable medium, comprising program instructions stored thereon for performing at least the following:
obtaining a target video segment, the target video segment being one of a plurality of video segments pre-divided according to an obtained video file scheduled for playing;
configuring a video enhancement parameter for the target video segment;
performing a video enhancement process on the target video segment according to the video enhancement parameter; and
displaying the enhanced target video segment on the screen;
wherein the program instructions are configured for further performing:
obtaining the video file scheduled for playing;
obtaining a plurality of keyframes of the video file scheduled for playing; and
dividing the video file scheduled for playing into the plurality of video segments according to the plurality of keyframes, wherein each of the video segments comprises one of the plurality of keyframes and comprises non-keyframes between the one of the plurality of keyframes and a next keyframe; and
wherein the configuring the video enhancement parameter for the target video segment comprises:

configuring the video enhancement parameter for the target video segment according to one keyframe corresponding to the target video segment.

\* \* \* \* \*